(12) United States Patent
Osada

(10) Patent No.: US 11,676,318 B2
(45) Date of Patent: Jun. 13, 2023

(54) IMAGE PROCESSING APPARATUS, IMAGE FORMING SYSTEMS, AND IMAGE PROCESSING METHOD THAT DRAW VARIABLE DATA AS AN AGGREGATE FIGURE WITH RESPECT TO FORM DATA

(71) Applicant: KYOCERA Document Solutions Inc., Osaka (JP)

(72) Inventor: Yoshihiro Osada, Torrance, CA (US)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 17/475,823

(22) Filed: Sep. 15, 2021

(65) Prior Publication Data
US 2023/0082736 A1 Mar. 16, 2023

(51) Int. Cl.
*G06T 11/60* (2006.01)
(52) U.S. Cl.
CPC ................................ *G06T 11/60* (2013.01)

(58) Field of Classification Search
None
See application file for complete search history.

(56) References Cited

U.S. PATENT DOCUMENTS

2008/0309980 A1  12/2008  Iguchi
2021/0209298 A1*  7/2021  Lim ...................... G06F 40/186

FOREIGN PATENT DOCUMENTS

JP  2009-023339 A  2/2009

* cited by examiner

*Primary Examiner* — Lennin R Rodriguezgonzalez
(74) *Attorney, Agent, or Firm* — Hawaii Patent Services; Nathaniel K. Fedde; Kenton N. Fedde

(57) ABSTRACT

Provided is an image processing apparatus that reduces the unnaturalness of variable printing. The terminal is this image processing apparatus for designing variable printing. The data acquisition unit acquires form data and variable data for variable printing. The variable drawing unit draws variable data as an aggregate figure with respect to the form data acquired by the data acquisition unit at an area where the drawing may be affected. The output unit outputs an aggregate figure drawn by the variable drawing unit.

15 Claims, 7 Drawing Sheets

A  longest data, non secure view, center aligned Samantha Rodriguez ~310

B  longest data, secure view, center aligned S?? ? ??? ? ??? ? z ~310

C  shortest data, non secure view, center aligned Mia White ~310

D  shortest data, secure view, center aligned M?? ???e ~310

FIG. 6

IMAGE PROCESSING APPARATUS, IMAGE FORMING SYSTEMS, AND IMAGE PROCESSING METHOD THAT DRAW VARIABLE DATA AS AN AGGREGATE FIGURE WITH RESPECT TO FORM DATA

BACKGROUND

The present disclosure particularly relates to an image processing apparatus, an image forming system, and an image processing method for designing variable printing.

There is an image forming apparatus such as multifunctional peripheral (MFP) that can print documents and images.

In the image forming apparatus, a technique called variable printing, which enables printing by replacing data one by one, is known. In variable printing, it is used for certificates, direct mails that have the same background but differ only in the address and name, or the like. In variable printing, some information can be separately replaced and printed on the same document to be produced in large quantities, so that personalization can be performed and the appealing power of the information can be further enhanced.

For example, when variable printing is performed for the direct mail, it is possible to register and print the address for each user as variable data for the form data of the common part. That is, the image forming apparatus can form an image at high speed and with a low load without repeatedly processing the common part.

As a typical technique, in order to shorten the processing time in large-scale variable printing, there is an apparatus that a clipping image generation means that cutting out the area for the shape of the variable object from a transparent processed image corresponding to the same transparent attribute as the transparent attribute specified for the variable object to generate clipping image and generating drawing data by superimposing a clipping image and a fixed object.

SUMMARY

An image processing apparatus according to the present disclosure is an image processing apparatus for designing variable printing, including: a data acquisition unit configured to acquire form data and variable data for variable printing; a variable drawing unit configured to draw the variable data as an aggregate figure with respect to the form data acquired by the data acquisition unit at an area where there is a possibility of an influence on drawing; and an output unit configured to output the aggregate figure drawn by the variable drawing unit.

An image forming system according to the present disclosure is an image forming system having an image forming apparatus capable of variable printing and an image processing apparatus for designing the variable printing, wherein the image processing apparatus including: a data acquisition unit configured to acquire form data and variable data for variable printing, a variable drawing unit configured to draw the variable data as an aggregate figure with respect to the form data acquired by the data acquisition unit at an area where there is a possibility of an influence on drawing, an output unit configured to output the aggregate figure drawn by the variable drawing unit, and a proofreading unit configured to proofread the form data according to the instruction information by the user based on output result of the aggregate figure; and the image forming apparatus including: a data receiving unit configured to receive the form data and variable data designed by the image processing apparatus, and an image forming unit that forms an image of the variable data on the form data received by the data receiving unit.

An image processing method according to the present disclosure is an image processing method executed by an image processing apparatus for designing variable printing, wherein the image processing apparatus executes the steps of: acquiring form data and variable data for variable printing; drawing the variable data as an aggregate figure with respect to acquired form data at an area where there is a possibility of drawing influence; outputting the aggregate figure that is drawn.

BRIEF DESCRIPTION OF THE DRAWINGS

FIG. 6 is a conceptual diagram of the variable drawing process as shown in FIG. 4.

DETAILED DESCRIPTION

Embodiment

[System Configuration of Image Forming System X]

Figure 1:
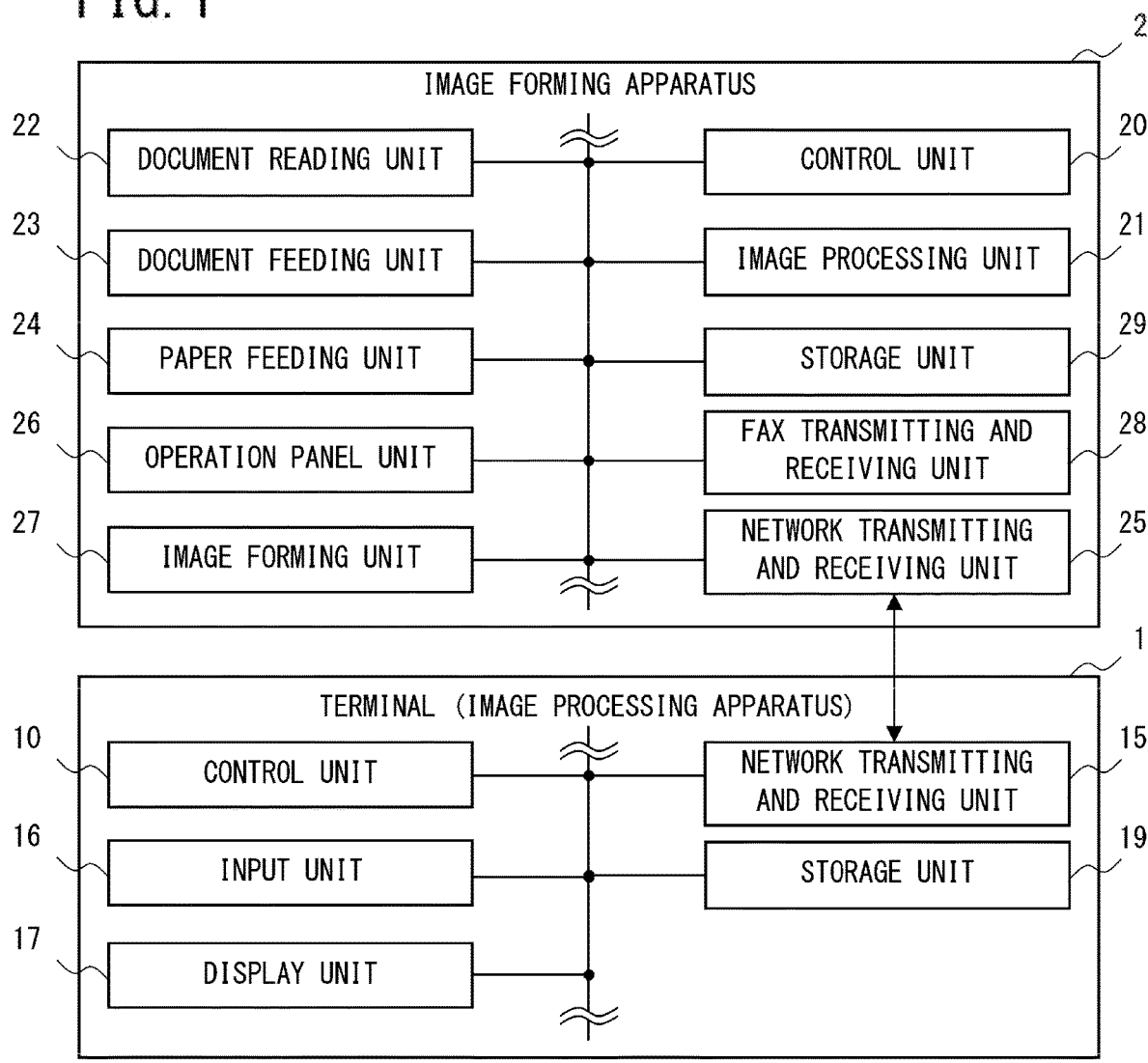
FIG. 1 is a system configuration diagram of an image forming system according to an embodiment of the present disclosure.

Firstly, with reference to FIG. 1, the system configuration of the image forming system X according to the embodiment of the present disclosure is described.

The image forming system X includes a terminal 1 that is an image processing apparatus for designing variable printing, and an image forming apparatus 2 capable of variable printing.

The terminal 1 is a PC (Personal Computer), a smartphone, a tablet terminal, a PDA (Personal Data Assistant), or the like, and it is possible to design a common form, or the like, for variable printing by the image forming apparatus 2.

Specifically, as application software (hereinafter, simply referred to as an "application"), the terminal 1 executes a design application, which is a dedicated design application for designing variable printing. Thus, the terminal 1 synthesizes the variable data 310 (FIG. 2) for the number of copies without recreating the data, and it displays the variable data 310 on the display unit 17 instead of printing. The user who designs this operate it to be able to design the form part of variable printing, and the like. That is, the terminal 1 performs a preview output similar to print by variable printing by the image forming apparatus 2. Then, the terminal 1 can modify the data according to the instruction of the user and create the data in which the unnaturalness of the variable printing is eliminated.

The image forming apparatus 2 is an image forming apparatus such as an MFP, a printer, or the like. The image forming apparatus 2 can perform variable printing by using the form data 300 (FIG. 2) designed by the terminal 1.

Firstly, the configuration of the terminal 1 is described.

The terminal 1 includes a control unit 10, a transmitting and receiving unit 15, an input unit 16, a display unit 17, and a storage unit 19. Each unit is connected to the control unit 10 and its operation is controlled by the control unit 10.

The control unit 10 is a information processing unit such as a CPU (Central Processing Unit), an MPU (Micro Processing Unit), a DSP (Digital Signal Processor), a GPU (Graphics Processing Unit), an ASIC (Application Specific Integrated Circuit), and the like.

The control unit 10 reads out the control program stored in the ROM or HDD of the storage unit 19, expands the control program in the RAM, and executes it, so that the control unit 10 can be operated as each part of the functional block as described later. Further, the control unit 10 controls the entire apparatus according to specified instruction information input from the input unit 16.

The transmitting and receiving unit 15 is a circuit, or the like, which transmits/receives data to/from the image forming apparatus 2. The transmitting and receiving unit 15 include a LAN (Local Area Network) board, a wireless transmitter and receiver, a USB (Universal Serial Bus) interface, and the like. Here, the transmitting and receiving unit 15 may not be directly connected to the image forming apparatus 2 but may be connected via an external network. The external network is, for example, a LAN, a wireless LAN (Wi-Fi®), a mobile telephone network, a dedicated communication network, another type of WAN (Wide Area Network), a voice telephone network, or the like.

The input unit 16 is an input device such as a touch panel, a keyboard, buttons, a mouse, a touch pad, an optical or an electromagnetic digitizer for performing operations by a user.

The display unit 17 is a display device such as an LCD (Liquid Crystal Display), an organic EL display (Organic Electro-Luminescence Display), an LED (Light Emitting Diode), or the like.

The input unit 16 and the display unit 17 may be integrally formed so that the input unit 16 can detect the position (coordinates) on the display unit 17.

The storage unit 19 is a non-transitory recording medium such as a ROM (Read Only Memory), a RAM (Random Access Memory), or the like, which are a semiconductor memory, an HDD (Hard Disk Drive), an optical recording medium, a magnetic tape device, or the like. In addition, the storage unit 19 also includes an external recording medium such as a flash memory card connected by a memory card reader, a USB memory, an optical disk device, or the like.

The storage unit 19 stores a device driver of the image forming apparatus 2, various applications, other programs, data, and the like, in addition to the OS (Operating System) for making the terminal 1 function as a computer. The various applications include the design application.

These programs and data can be executed, read, and written by the control unit 10.

Next, the control configuration of the image forming apparatus 2 is described.

The image forming apparatus 2 includes an image processing unit 21, a document reading unit 22, a document feeding unit 23, a paper feeding unit 24, a network transmitting/receiving unit 25, an operation panel unit 26, an image forming unit 27, a fax transmitting and receiving unit 28, a storage unit 29, and the like. Each unit is connected to the control unit 20 and its operation is controlled by the control unit 20.

The control unit 20 is an information processing unit such as a GPP (General Purpose Processor), a CPU, an MPU, a DSP, a GPU, an ASIC, or the like.

The control unit 20 reads out the control program stored in the ROM or HDD of the storage unit 29, expands the control program in the RAM, and executes it, so that the control unit 20 can be operated as each part of the functional block as described later. Further, the control unit 20 controls the entire apparatus according to specified instruction information input from the terminal 1 or the operation panel unit 26.

The image processing unit 21 is a control calculation unit such as a DSP, GPU, or the like. The image processing unit 21 performs specified image processing on the image data. This specified image processing may be, for example, processing such as enlargement/reduction, density adjustment, gradation adjustment, image improvement, and the like.

Further, the image processing unit 21 stores the image read by the document reading unit 22 in the storage unit 29 as print data. At this time, the image processing unit 21 can also convert the print data into an electronic document such as PDF (Portable Document Format), or the like, or a file of image data such as TIFF, or the like. Further, the image processing unit 21 may be able to execute at least a part of OCR (Optical Character Recognition) processing.

The document reading unit 22 reads the set document. Further, the document reading unit 22 is arranged above the main body of the image forming apparatus 2.

The document reading unit 22 includes a scanner, platen glass, and a document reading slit. When reading a document placed on the platen glass, the document reading unit 22 moves the scanner to a position facing the platen glass and scans the document placed on the platen glass to acquire image data. Then, the document reading unit 22 stores the acquired image data in the storage unit 19.

Further, the document reading unit 22 moves the scanner to a position facing the document reading slit when reading the document supplied from the document feeding unit 23. Then, the document reading unit 22 reads the document through the document reading slit in synchronization with the document transport operation by the document feeding unit 23, and it acquires image data. The document reading unit 22 stores the acquired image data in the storage unit 19.

The document feeding unit 23 conveys the document read by the document reading unit 22. The document feeding unit 23 is arranged above the document reading unit 22.

The document feeding unit 23 includes a document loading unit and a document transport mechanism. The document feeding unit 23 feeds the documents placed on the document loading unit to the document reading unit 22 one by one by the document transport mechanism.

The paper feeding unit 24 feeds the recording paper one by one toward the image forming unit 27. The paper feeding unit 24 is provided in the main body unit.

The transmitting and receiving unit 25 is a network connection unit including a LAN board, a wireless transceiver, and the like for connecting to an external network.

The transmitting and receiving unit 25 transmits and receives data on a data communication line, and transmits and receives a voice signal on a voice telephone line.

The operation panel unit 26 includes an input unit such as buttons, a touch panel, or the like, and a display unit such as an LCD, an organic EL display, or the like. Further, the operation panel unit 26 is arranged on the front side of the image forming apparatus 2.

The input unit of the operation panel unit 26 includes a numeric pad, a start button, a cancel button, operating mode switching buttons, buttons for instructing relating to execution of a job, or the like. Among these, the operation mode may include various modes such as copying, fax transmission, scanner, and network scanner, or the like. The job also includes printing, sending, saving, recording, or the like, for a selected document. The input unit of the operation panel unit 26 acquires instructions for various jobs of the image forming apparatus 2 by the user. It is also possible to input and change the information of each user according to the user's instruction acquired from the operation panel unit 26.

The image forming unit 27 forms an image on a recording paper by the data stored in the storage unit 29, read by the document reading unit 22, or acquired from the terminal 1 according to the output instruction of the user.

The image forming unit 27 includes a photoconductor drum, an exposure unit, a developing unit, a transfer unit, a fixing unit, and the like. The image forming unit 27 records a toner image on a recording paper by executing an image forming process including charging, exposure, development, transfer, and fixing.

The FAX transmitting and receiving unit 28 transmits and receives a facsimile. The FAX transmitting and receiving unit 28 can receive a facsimile from another FAX apparatus via a voice line, store the fax in the storage unit 29, and cause the image forming unit 27 to form an image. Further, the FAX transmitting and receiving unit 28 can convert the document read by the document reading unit 22 or the network FAX data transmitted from the terminal 1 into image data and facsimile-transmit to another FAX apparatus by the voice line.

The storage unit 29 is a non-transitory recording medium such as a semiconductor memory of a ROM, a RAM, or the like, or an HDD, or the like.

The RAM of the storage unit 29 keeps the stored contents by a function such as self-refreshing even in a power saving state. A control program for controlling the operation of the image forming apparatus 2 is stored in the ROM or HDD of the storage unit 29. In addition to this, the storage unit 29 also stores the user's account settings. Further, the storage unit 29 may include an area of a storage folder for each user.

In addition, the terminal 1 and the image forming apparatus 2, the control unit 10, the control unit 20, and the image processing unit 21 may be integrally formed such as a CPU with a built-in GPU, a chip-on-module package, an SOC (System On a Chip), or the like.

Further, the control unit 10, the control unit 20, and the image processing unit 21 may have a built-in RAM, ROM, flash memory, or the like.

[Functional Configuration of Image Forming System X]

Figure 2:
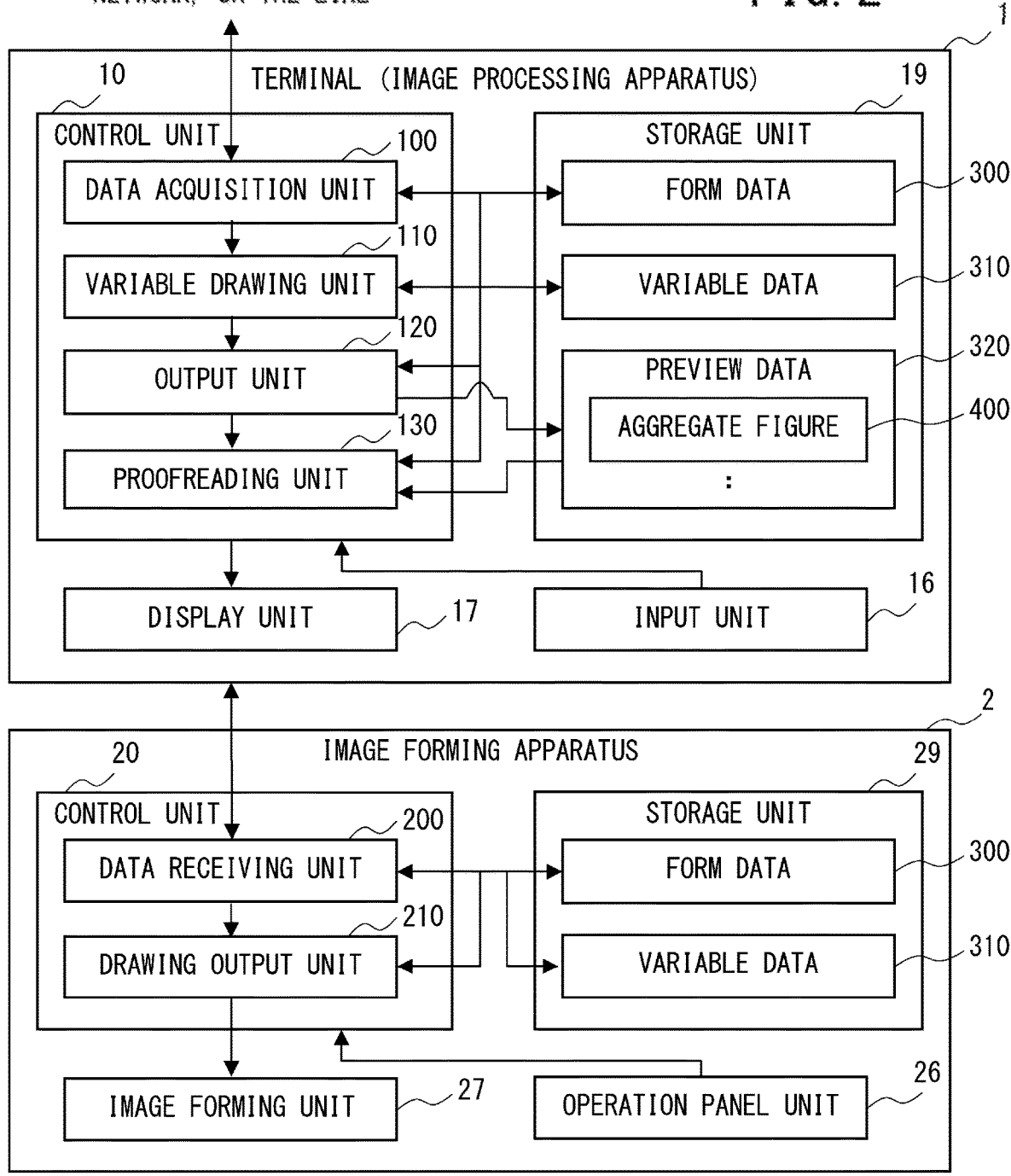
FIG. 2 is a block diagram showing a functional configuration of the image forming system according to the embodiment of the present disclosure.

Here, with reference to FIG. 2, the functional configuration of the image forming system X is described.

The control unit 10 of the terminal 1 includes a data acquisition unit 100, a variable drawing unit 110, an output unit 120, and a proofreading unit 130.

The storage unit 19 stores form data 300, variable data 310, and preview data 320.

The control unit 20 of the image forming apparatus 2 includes a data receiving unit 200 and a drawing output unit 210.

The storage unit 29 stores the form data 300 and the variable data 310.

The data acquisition unit 100 acquires the form data 300 and the variable data 310 for variable printing. This acquisition may be performed from the customer's external recording medium or network.

The variable drawing unit 110 draws the variable data 310 as the aggregate FIG. 400 with respect to the form data 300 acquired by the data acquisition unit 100 at an area where the drawing may be affected.

At this time, the variable drawing unit 110 can express the aggregate FIG. 400 as a cloud-like object with shading, no shading, or only the maximum contour line.

In addition, the variable drawing unit 110 can draw the aggregate FIG. 400 so that at least a part of each data of the variable data 310 is difficult to be recognized.

The output unit 120 outputs an aggregate FIG. 400 drawn by the variable drawing unit 110.

Specifically, the output unit 120 creates a preview of the entire page including the aggregate FIG. 400 as preview data 320. That is, the output unit 120 creates a print image including the aggregate FIG. 400 drawn by the variable drawing unit 110.

The proofreading unit 130 proofreads the form data 300 according to the instruction information by the user based on the output result of the aggregate FIG. 400.

Specifically, the proofreading unit 130 can edit the form data 300 with the GUI (Graphical User Interface) of the design application.

The data receiving unit 200 receives the form data 300 and the variable data 310 designed by the terminal 1. The data receiving unit 200 may receive or acquire these data via a network or by the external recording medium.

The drawing output unit 210 draws and outputs the variable data 310 to the form data 300, which is received by the data receiving unit 200, and outputs it to the image forming unit 27 as band data, which is image data.

In the present embodiment, the image forming unit 27 forms an image on the recording paper of the band data of the variable printing output by the drawing output unit 210. As a result, the image forming unit 27 can form an image of the variable data 310 on the form data 300 received by the data receiving unit 200.

Figure 3:
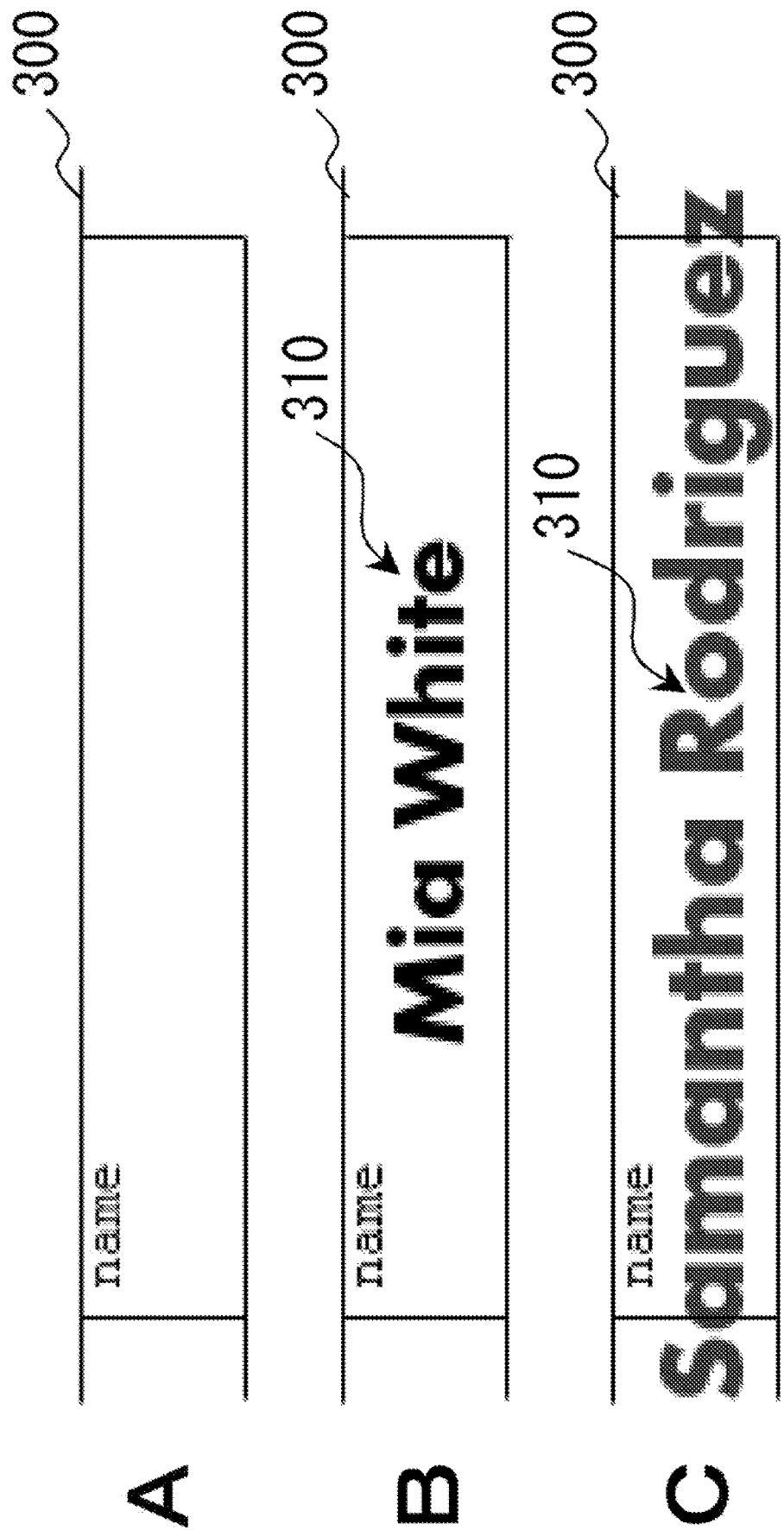
FIG. 3 is a conceptual diagram showing an example of the form data and variable data as shown in FIG. 2.

With reference to FIG. 3, the form data 300 and the variable data 310 are described.

The form data 300 is data including a common form for performing variable printing, which basically does not change at the time of printing. The form data 300 may be data such as PDL (Page Description Language), PPML (Personalized Print Markup Language) having XML (Extensible Markup Language) format, or the like. The form data 300 includes layout information that defines the layout on the page, and the like. The layout information includes format information such as the position (coordinates) and size of the form on the page, the font size of the variable data 310, left alignment, center alignment, right alignment, or the like. Further, the form data 300 may also include the definition data of the variable data 310. In addition, the form data 300 may include image data such as jpg, gif, BMP, PNG, TIFF, or the like, document data such as PDF data, or the like, or other data.

The element "A" in FIG. 3 shows an example of a form for inputting a name in the form data 300.

The variable data 310 is data for changing the print content at the time of printing. The variable data 310 may be a database such as tab-separated or comma-separated file, a spreadsheet application file, another type database file, a list file, or the like. The variable data 310 can acquire a file in a format that is easy to handle as a database.

The element "B" in FIG. 3 shows an example in which the names are drawn in the center alignment on the form for inputting the name on the element "A" in FIG. 3.

The element "C" in FIG. 3 shows an example in which the name is drawn in the center alignment on the same form, and the name is stuck out and becomes unnatural. That is, this form shows an example of an area that has an influence on drawing.

The preview data 320 is image data drawn as a print image. In the preview data 320, the aggregate FIG. 400 may be drawn with respect to the image for each page where the form data 300 is drawn. Specifically, the preview data 320 may be bitmap data having the same resolution as the band data actually output by the drawing output unit 210 of the image forming apparatus 2, bitmap data having a reduced resolution, or the like.

Here, the control unit 10 of the terminal 1 is made to function as a data acquisition unit 100, a variable drawing unit 110, an output unit 120, and a proofreading unit 130 by executing a control program including the design application stored in the storage unit 19.

The control unit 20 of the image forming apparatus 2 is made to function as a data receiving unit 200 and a drawing output unit 210 by executing a control program stored in the storage unit 29.

Further, each part of the terminal 1 and the image forming apparatus 2 as described above becomes a hardware resource for executing the image processing method according to the present embodiment.

In addition, apart or any combination of the above-mentioned functional configurations may be configured in hardware-like or circuit-like by using IC, programmable logic, FPGA (Field-Programmable Gate Array), or the like.

[Variable Printing Process by Image Forming System X]

Next, with reference to FIGS. 4 to 7, the variable printing process by the terminal 1 and the image forming apparatus 2 according to the embodiment of the present disclosure is described.

In the variable printing process of the present embodiment, firstly, the form data 300 is designed by the terminal 1. In the process of this design, the terminal 1 acquires the form data 300 and the variable data 310 for variable printing. Then, the variable data 310 is drawn as an aggregate FIG. 400 with respect to the acquired form data 300 at an area where there may be an influence on drawing. Next, the drawn aggregate FIG. 400 is output. Then, the user browses this, gives a proofreading instruction of the form data 300, and it is completed the design of the form data 300. The variable printing can be performed by the image forming apparatus 2 by using the designed form data 300 and variable data 310.

In the variable printing process of the present embodiment, the control unit 10 mainly executes the control program stored in the storage unit 19, and the control unit 20 executes the control program stored in the storage unit 29 in cooperation with each unit by using hardware resources, respectively.

Figure 4:
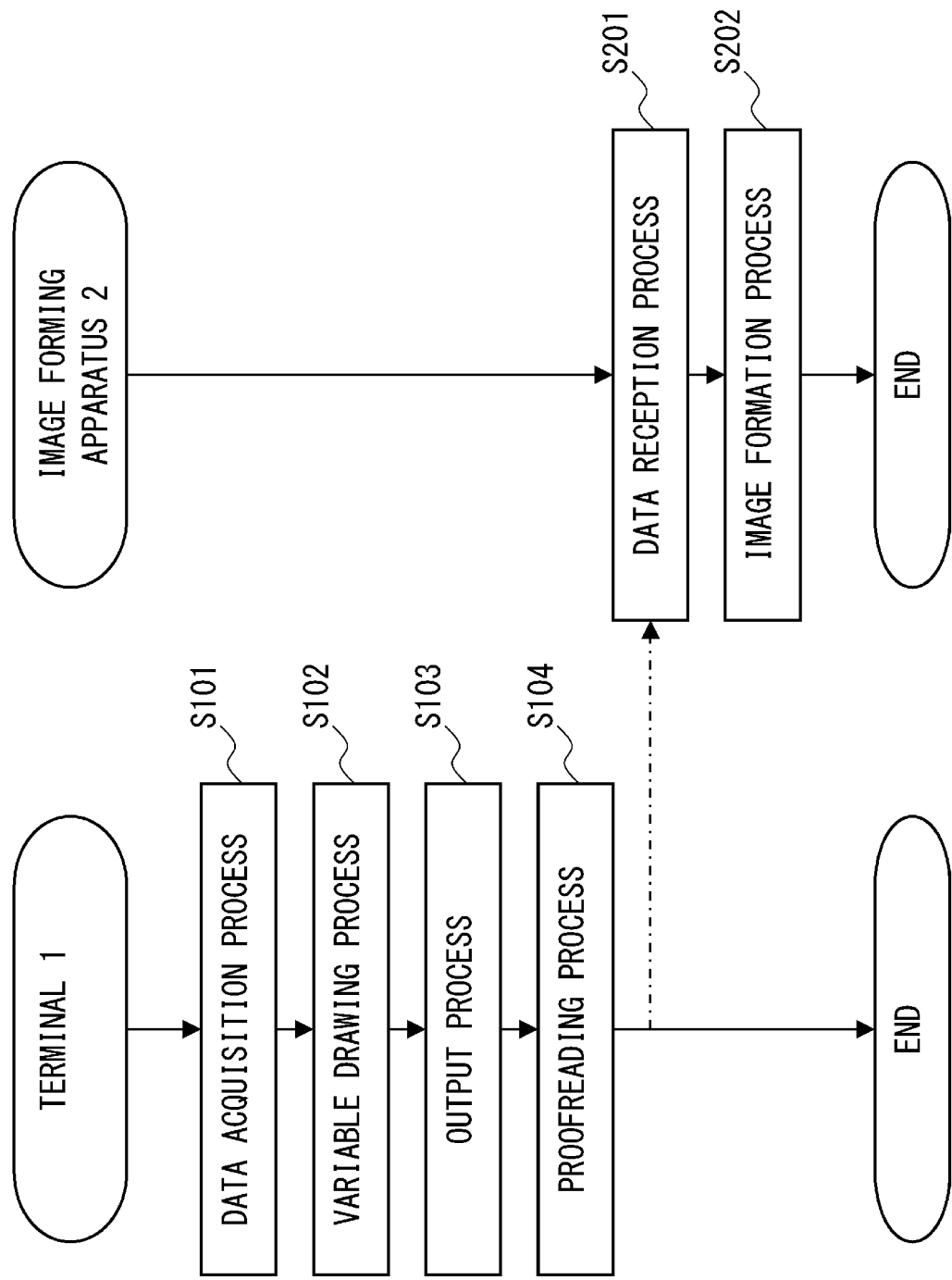
FIG. 4 is a flowchart of the variable printing process according to the embodiment of the present disclosure.

Hereinafter, with reference to the flowchart of FIG. 4, the details of the variable printing process are described step by step.

(Step S101)

Firstly, the data acquisition unit 100 of the terminal 1 performs the data acquisition process.

In the present embodiment, as one of the typical cases, an example in which a user such as a technician of a print shop or a designer designs variable printing is described.

The user receives the form data 300 and the variable data 310 for variable printing from the customer via an external recording medium or the network. In this embodiment, an example in which the variable data 310 is a spreadsheet file is described. The data of description items such as a set of characters and figures is taken out from the variable data 310 in units of printing, inserted into the setting area of the form data 300, and printed. The definition data of the form data 300 also includes processing procedures such as the insertion position (coordinates) of the data of the description item and the insertion method as scripts and macro language data, or the like.

When the design application is started, the data acquisition unit 100 acquires the received form data 300 and the variable data 310 and stores them in the storage unit 19.

(Step S102)

Next, the variable drawing unit 110 performs the variable drawing process.

The variable drawing unit 110 draws the variable data 310 as the aggregate FIG. 400 with respect to the form data 300 acquired by the data acquisition unit 100 at an area where the drawing may be affected.

More specifically, the variable drawing unit 110 reads out the data of each description item in the variable data 310, inserts all the data into the setting points of the form data 300 according to the processing procedure included in the form data 300, and draws the data to synthesize them all. As a result, the variable drawing unit 110 draws the aggregate FIG. 400. Thus, the variable drawing unit 110 can graphically represent the portion affected by the variable printing.

Specifically, the variable drawing unit 110 draws the aggregate FIG. 400 as a cloud-like figure drawn by collecting the data of all the description items in the variable data 310 at the setting area of the form data 300. At this time, the variable drawing unit 110 can express the aggregate FIG. 400 as an object of a cloud-like aggregate of "with shading", "no shading", or "only the maximum contour line". Here, "with shading" is a method of expressing by changing the density or color, "no shading" is a method of almost not changing the density and color, and "only the maximum contour line" is a method of expressing only the outline of the cloud without shading. That is, in the case of "with shading", the variable drawing unit 110 can be expressed as a cloud-like object such as a cloud expressing the frequency of appearance by density or color change, a cloud specifying a frequency range, a cloud coloring differently for each frequency range, or the like. Further, in the case of "no shading", the variable drawing unit 110 expresses all the drawing at a density of 100% (full overwritten) by logical OR. Further, in the case of "only the maximum contour line", the variable drawing unit 110 can express the aggregate FIG. 400 as an object of the figure having only the border by performing the edge extraction process after the logical OR.

That is, the variable drawing unit 110 can acquire the user's instruction by the input unit 16 in the GUI and can select the expression according to the user's preference.

Figure 5:
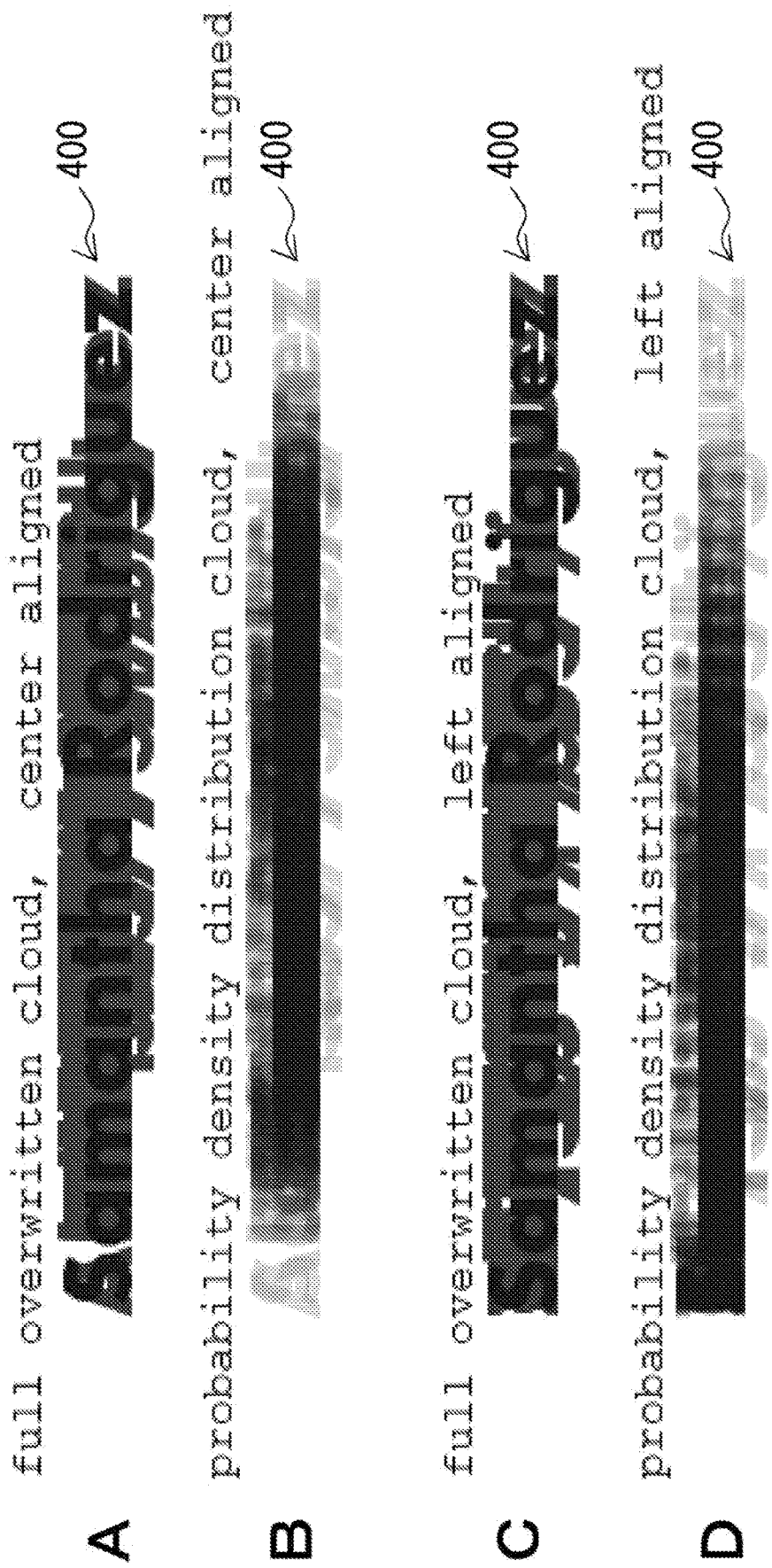
FIG. 5 is a conceptual diagram of the variable drawing process as shown in FIG. 4.

FIG. 5 shows a drawing example of the aggregate FIG. 400. That is, each of the synthesized variable data 310 has a shape as shown in FIG. 5.

The element "A" in FIG. 5 shows an example in which the form data 300 includes an instruction with "center aligned" and is drawn with setting of "full overwritten" and "no shading". Such a cloud-shaped figure drawn with "no shading" is convenient for grasping the maximum shape when the data of the description items in the variable data 310 is drawn.

The element "B" in FIG. 5 shows an example in which the drawing is similarly center aligned, with setting of "with shading" and "cloud expressing the frequency of appearance by density". In this way, the figure where each part is shaded by the probability distribution is convenient to know which part is the most.

The element "C" in FIG. 5 shows an example in which the drawing is left aligned and "full overwritten" is set.

The element "D" in FIG. 5 shows an example in which the drawing is similarly left aligned, with setting of "with shading" and "cloud expressing the frequency of appearance by density".

As described above, even if the set of the same variable data 310 is used, the appearance differs depending on the drawing and expression methods. In addition, if the data of a large number of description item in the variable data 310 is drawn, the character string in the aggregate FIG. 400 cannot be read, so that security can be ensured.

Here, in a case that quantity of the data of the description items is smaller than a specific number, in a case that the selected specific variable data 310 is to be displayed for verification, or the like, the description item of the variable data 310 becomes visually recognizable in the aggregate FIG. 400.

In such a case, the variable drawing unit 110 may convert at least a part of the description items of the variable data 310 so as to be difficult to be recognized. After that, the variable drawing unit 110 can also draw the aggregate FIG. 400.

Specifically, the variable drawing unit 110 can draw the data of the description item in the variable data 310 by replacing the data with representative data or dummy data, or the like. As the replacement, for example, the variable drawing unit 110 can be replaced with some mark, a name created so that a part of the actual name is hidden and the same size, or a virtual name or virtual address that does not exist.

FIG. 6 shows an example of converting one of the data of a description item into a hidden character.

The element "A" in FIG. 6 shows an example in which the data of the description item in the maximum length of the variable data 310 is drawn in the center alignment without being hidden.

The element "B" in FIG. 6 is an example in which the data of the element "A" in FIG. 6 becomes visually unrecognizable by inserting hidden characters. Here, if the data of the description item is simply replaced with "?" or the like as a hidden character, the entire character string does not have the same size at the time of drawing due to the difference in the vertical width and the horizontal width of the character(s). Therefore, the variable drawing unit 110 draws in the process at the time of font drawing so that the size (actual dimension) of each character is the same as if the characters are not hidden. As a result, the entire character string becomes the same size as if the hidden characters are not used.

Similarly, the element "C" in FIG. 6 shows an example in which the data of the item to be described with the shortest length of the variable data 310 is drawn in the center alignment without being hidden.

The element "D" in FIG. 6 shows an example in which data of the element "C" in FIG. 6 is drawn in the center alignment by inserting hidden characters to make it unreadable. Also in this case, the variable drawing unit 110 draws so that the size of each character is the same. As a result, the entire character string becomes the same size as if the hidden characters are not used.

Here, in the above example, for the description items, only the beginning and the end of the character string are displayed, and the other characters are replaced with "?".

However, for example, it is possible to perform processing such as leaving or replacing only tall characters at the top and bottom. Further, in addition to the "?", processing such as replacing with a camouflaged font close to the alphabet or a line drawing figure, randomly replacing with characters of the same size, or the like, may be performed.

(Step S103)

Next, the output unit 120 performs output process.

The output unit 120 generates a preview of the entire page including the aggregate FIG. 400 as preview data 320 and stores it in the storage unit 19. That is, in the terminal 1, by using the design application, the output almost the same as the actual variable printing can be previewed on the screen of the display unit 17. This makes it possible to easily verify all print outputs.

Here, as is described later, also in the image forming apparatus 2, the form data 300 and the variable data 310 are configured to be drawn, separately. Therefore, the output unit 120 can draw the form data 300 by the same method and synthesize it with the object of the aggregate FIG. 400 in which all the data of the description items in the variable data 310 are combined. That is, the output unit 120 can generate the preview data 320 by the same method as the variable printing in the image forming apparatus 2.

The preview data 320 makes it possible for the user to check the image on the design application instead of printing it. As a result, it is possible to almost eliminate the deviation of the position from the actual printing, or the like, and the reliability of the preview can be improved.

(Step S104)

Next, the component unit performs the proofreading process.

The proofreading unit 130 acquires instruction information by the user based on the output result of the aggregate FIG. 400 by the input unit 16.

Specifically, the proofreading unit 130 acquires the instruction information such as moving the object of the aggregate FIG. 400 or modifying the form data 300 by the GUI of the design application. The proofreading unit 130 proofreads the form data 300 based on this instruction information.

Figure 7:
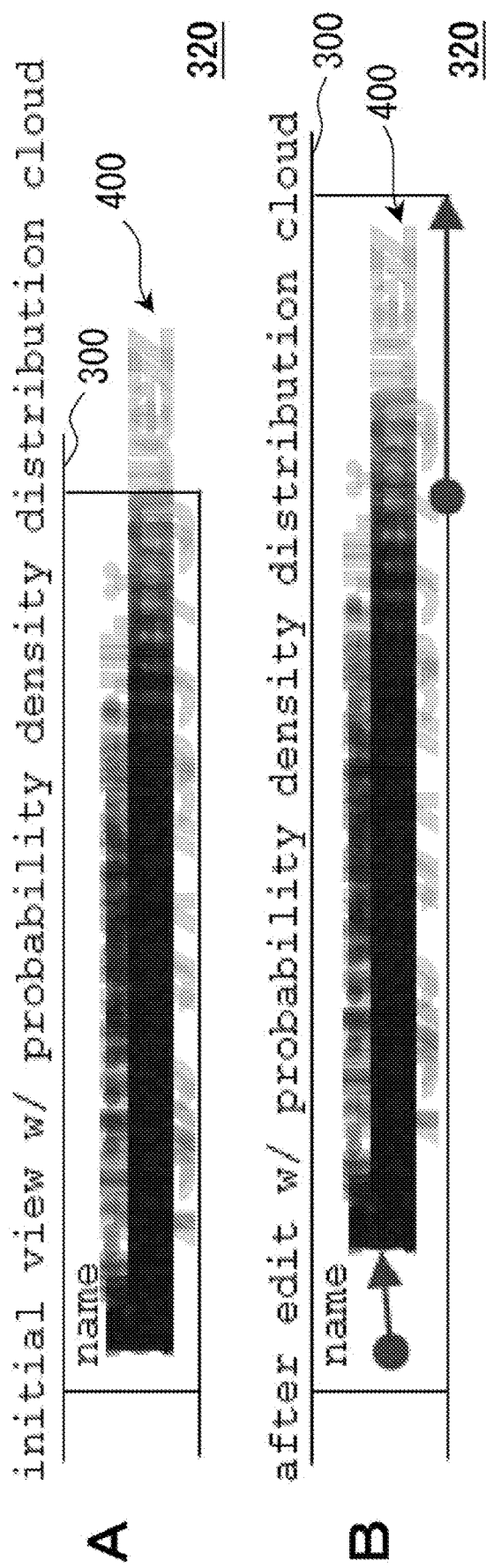
FIG. 7 is a conceptual diagram of the proofreading process as shown in FIG. 4.

FIG. 7 shows an example of proofreading by using a cloud-shaped aggregate object, which is the aggregate FIG. 400. In this example, the size of the form can be changed with respect to the aggregate FIG. 400, and the layout can be easily adjusted.

The element "A" in FIG. 7 shows an example of a state before proofreading in which the form data 300 and the variable data 310 acquired by the user are drawn as they are. Specifically, the element "A" in FIG. 7 is an image of initial evaluation in which the image of the aggregate FIG. 400 of the element "D" in FIG. 5 and the image of the form are combined. In this example, (1) printing near the character "name" in the form occurs quite frequently, and that is, an interference may occur at the part of the "name" in the form depending on the variable data 310. (2) The part below the baseline in lowercase letters is too close to the frame, and although the frequency is not high, the characters in lowercase letters that protrude below the baseline are close to the lower frame and difficult to see. (3) In the case of a long character string, it greatly exceeds the right frame and extends beyond. These problems are obvious by visual inspection.

According to the element "B" in FIG. 7, the user of the design application is instructed to drag the object of the aggregate FIG. 400 to move it to the right and slightly up. Next, because there is room on the right side of the frame of the form, the user instructs to move the right border of the frame further to the right and widen the right side of the frame so that it may not interfere. According to the example of the density of the aggregate FIG. 400, it is drawn in the center of the frame in many cases, but in rare cases, it is drawn to the right in the case of a long character string. If the customer's approval is required for such a change in the form data 300, the user may also possible for the customer to view the image in this state on the spot.

Further, the proofreading unit 130 can change the superimposition of each form of the form data 300 with the object of the aggregate FIG. 400, and it can change the transparency or the superposition order.

This completes the design of the form data 300. The user can also complete the reception of data from the customer and adjust the printing schedule, or the like.

(Step S201)

Next, the data receiving unit 200 of the image forming apparatus 2 performs the data receiving process.

When the data receiving unit 200 receives the form data 300 and the variable data 310 designed by the image processing apparatus, the data receiving unit 200 stores the form data 300 and the variable data 310 in the storage unit 29. This reception may be via an external network or an external recording medium.

(Step S202)

Next, the drawing output unit 210 and the image forming unit 27 perform the image forming process.

Here, the drawing output unit 210 draws the form data 300 and the variable data 310 separately and synthesizes them. At this time, the drawing output unit 210 preprocesses the form data 300 so as not to require redrawing as much as possible. That is, since the form data 300 is common, the drawing output unit 210 may draw the form data 300 only once. Then, the drawing output unit 210 temporarily stores the image data of the drawn one or a plurality of form images in the storage unit 29.

On the other hand, for the variable data 310, the drawing output unit 210 may draw differently on a unit of copy. In this case, the amount of data is relatively small and drawing does not take time. As the data of the description item in the variable data 310 at this time, different data are used for each unit of copy.

The drawing output unit 210 applies the drawing image data of the variable data 310 to the image data of the form image, superimposes it on an appropriate layer, and synthesizes the image data. That is, the drawing output unit 210 draws by replacing only the variable data 310 with respect to the common form image. As a result, the drawing output unit 210 creates a print image for each page. This print image is used for printing in units of copies.

The drawing output unit 210 generates band data from this print image and outputs it to the image forming unit 27. The band data is image data for each band, which is a unit for forming an image. For example, the band data may be bitmap image data of each color.

The image forming unit 27 forms an image of the band data and records it on a recording paper. The drawing output unit 210 and the image forming unit 27 continue this process until all the data of the description items in the variable data 310 are drawn and image formed in units of copies.

As described above, the variable printing process according to the embodiment of the present disclosure is completed.

As configured in this way, the following effects can be acquired.

Typical variable printing has been used, for example, incases where the name and address of the target person are printed in advance on the application form in order to improve the application acquisition rate.

However, in such a case, the long name may protrude from the form, or the short name may be too small in the form, resulting in an imbalance and unnaturalness.

Similarly, if it extends beyond the frame of the form, it may be set to automatically reduce the size. This makes possible to print it so that it can be read even for some exceptions, but the partially reduced characters are very unsightly.

Due to such unnaturalness, the person who has received the application form is impressed that it is automatically generated in large quantities, and on the contrary, he or she may become taking little interest in the form. This may reduce the application acquisition rate.

On the other hand, the image forming system X according to the embodiment of the present disclosure is an image forming system having an image forming apparatus 2 capable of variable printing and the terminal 1 that is an image processing apparatus for designing the variable printing, wherein the terminal 1 includes: a data acquisition unit 100 that acquires form data 300 and variable data 310 for variable printing, a variable drawing unit 110 that draws the variable data 310 as an aggregate FIG. 400 with respect to the form data 300 acquired by the data acquisition unit 100 at an area where there is a possibility of an influence on drawing, an output unit 120 that outputs the aggregate FIG. 400 drawn by the variable drawing unit 110, and a proofreading unit 130 that proofreads the form data 300 according to the instruction information by the user based on output result of the aggregate FIG. 400; and the image forming apparatus 2 includes: a data receiving unit 200 that receives the form data 300 and variable data 310 designed by the terminal 1, and a drawing output unit 210 that performs drawing and outputting variable data 310 to the form data 300 received by the data receiving unit 200 and causing the image forming unit 27 to form an image.

With this configuration, it is possible to confirm the area where a defect occurs when the variable data 310 is applied in variable printing, and to design the form data 300 in which the defect is eliminated. As a result, the work of variable printing engineers and designers can be streamlined, and output verification by using all variable data 310 can be executed in a short period of time and with a simple operation. In addition, it becomes not to be required the verification after print outputting. Furthermore, performing review work by multiple people can also be easier.

As a result, an ideal design for the user, which eliminates the unnaturalness of variable printing can be realized. Thus, it can be expected that the person who receives the printed matter may not be felt to have one of the many printed in variable printing.

Further, the terminal 1 according to the embodiment of the present disclosure is further provided with a proofreading unit 130 that proofreads the form data 300 based on the instruction information by a user based on output result of the aggregate FIG. 400.

With this configuration, the form data 300 for variable printing can be easily proofread. That is, the form and the aggregate FIG. 400 can be combined and output, and the size of the frame of the form, and the like, can be adjusted according to the result. Further, as soon as the data is accepted, the entire variable data 310 to be printed can be evaluated. Therefore, customer satisfaction can be increased. In addition, the difference due to individual skill in variable printing design are less likely to occur, and the human cost can be reduced.

Further, in the terminal 1 according to the embodiment of the present disclosure, the variable drawing unit 110 express the aggregate FIG. 400 as a cloud-like object with shading, no shading, or only maximum contour line.

With this configuration, the aggregate FIG. 400 on which the variable data 310 is drawn can be appropriately presented to the user by various expression methods.

Further, in the terminal 1 according to the embodiment of the present disclosure, the variable drawing unit 110 draws the aggregate FIG. 400 so that at least a part of each data of the variable data 310 is difficult to be recognized.

By configured in this way, expressing the words together with the hidden characters, it can be useful for protecting personal information and confidential information. That is, it is possible to prevent the proofreader from touching the personal information in addition to the engineer or designer who designs the variable printing.

Further, in the terminal 1 according to the embodiment of the present disclosure, the output unit 120 creates a preview of the entire page including the aggregate FIG. 400.

With this configuration, the result of applying the variable data 310 to the form data 300 with the actual variable data 310 can be easily confirmed, and the form can be easily modified. In addition, the automatic reduction by setting, or the like, can be checked.

Furthermore, by generating the preview data 320 in the same output format as the image forming apparatus 2 for variable printing, differences between variable printing design and actual printing are less likely to occur, and the printing is more reliable.

Other Embodiments

In addition, in the above-described embodiment, an example in which the form data 300 is commonly used and is not changed is described.

However, depending on the insertion method included in the definition data of the form data 300, the drawing itself of the form data 300 may be changed when drawing each of the description item in the variable data 310.

In such a case, in the terminal 1 according to the embodiment of the present disclosure, the output unit 120 may show the other parts of the form data 300 that are affected by the output of the variable parts by the variable data 310 by outputting the influence examples in an overlapping manner.

With this configuration, even if the drawing itself of the form data 300 changes due to the data of the description item in the variable data 310, the output unit 120 can point out a portion affected by this. Specifically, the output unit 120 presents, for example, the other parts of the form data 300 affected by the output of the variable part by the variable data 310 by superimposing and outputting the influence examples.

As a result, the user can confirm the influence on the drawing of the form data 300. More specifically, when the drawing itself of the form data 300 changes, the output changes may occur. This change includes, for example, the position of the word outside the form shifts depending on the length of the description, carriage return occurs due to hyphenation processing, the word at the end of the page moves to the next page, or the like. The output unit 120 can notify the user of the design application by overwriting these parts, or the like. At this time, the output unit 120 may notify the user by displaying a plurality of examples, highlighting, displaying in red colored text, or the like.

More specifically, it is possible to prevent a situation in which rarely occurring data damages the design of the majority of other data. For example, when a variable-printed name is inserted, the relevant part can be processed naturally, but it is also possible to deal with a situation where the length of the sentence changes as an effect. That is, it is possible to prevent an accident that occurs in variable printing in which a part of the text that should be included in the page is moved to the next page or disappears. Further, depending on the data of the description item in the variable data 310, it is possible to design by considering the arrangement with the majority of the data while dealing with a rarely occurring situation.

In addition, as described above, when the drawing itself of the form data 300 changes due to the application of the variable data 310 to the form, the drawing output unit 210 may draw the form data 300 and the variable data 310 in units of copies.

Further, in the above-described embodiment, an example in which the object of the aggregate FIG. 400 is represented with shading by using the appearance frequency is described.

In addition to this, the other setting can be made by using the GUI of the setting screen of the design application regarding to the method of drawing and expressing the aggregate FIG. 400. Such the other setting includes, for example, the frequency of appearance and the transparency of the aggregate, using the logical sum or not, the range of densities and using the saturation or not, each color when changing colors instead of shading, edging, overlay order, or the like. In addition, it is possible to set the shading so that it is performed in stages rather than continuously.

With this configuration, an appropriate aggregate FIG. 400 can be drawn according to the data type and properties of the form data 300 and the variable data 310, and it can be easily confirmed by the user.

In the above-described embodiment, an example of viewing the aggregate FIG. 400 as preview data 320 on the display unit 17 has been described.

However, it is of course possible to print and confirm the preview data 320 on the image forming apparatus 2. Further, the preview data 320 may be facsimile-transmitted, or may be converted into electronic document data such as PDF and transmitted by e-mail.

In the above-described embodiment, an example of executing the design application by using the terminal 1 as an image processing apparatus has been described.

However, a configuration that a server on the network may be as an image processing apparatus, and the above-mentioned design application may be installed on this server. In this case, the server is accessed and the designing is performed by the terminal 1 or the image forming apparatus 2. Further, by installing the design application as a web application, on the web browser of the terminal 1 or the image forming apparatus 2, the design of the variable printing may be able to perform. Alternatively, a design application may be installed in the image forming apparatus 2, and the operation panel unit 26 may be used to design variable printing in the same manner as in the terminal 1 as described above.

With such a configuration, it becomes possible to design variable printing with a flexible configuration.

Further, the present disclosure can be applied to apparatuses other than the terminal 1 and the image forming apparatus 2. That is, a network scanner, a server or the like to which the scanner is separately connected by USB or the like may be used.

Further, it goes without saying that the configuration and operation of the above-described embodiment are examples, and it can be appropriately modified and executed without departing from the gist of the present disclosure.

What is claimed is:

1. An image processing apparatus for designing variable printing, comprising:
    a data acquisition unit configured to acquire form data and variable data for variable printing;
    a variable drawing unit configured to draw the variable data as an aggregate figure with respect to the form data acquired by the data acquisition unit at an area where there is a possibility of an influence on drawing;
    an output unit configured to output the aggregate figure drawn by the variable drawing unit; and
    a proofreading unit configured to proofread the form data based on instruction information by a user based on output result of the aggregate figure.

2. The image processing apparatus according to claim 1, wherein
    the variable drawing unit express the aggregate figure as a cloud-like object with shading, no shading, or only maximum contour line.

3. The image processing apparatus according to claim 1, wherein
    the variable drawing unit draws the aggregate figure so that at least a part of each data of the variable data is difficult to be recognized.

4. The image processing apparatus according to claim 1, wherein
    the output unit generates a preview of the entire page including the aggregate figure.

5. The image processing apparatus according claim 1, wherein
    the output unit presents another part of the form data that is affected by output of variable part by using the variable data, by overlapping and outputting an influence example.

6. An image forming system having an image forming apparatus capable of variable printing and an image processing apparatus for designing the variable printing, wherein
    the image processing apparatus comprising:
    a data acquisition unit configured to acquire form data and variable data for variable printing,
    a variable drawing unit configured to draw the variable data as an aggregate figure with respect to the form data acquired by the data acquisition unit at an area where there is a possibility of an influence on drawing,
    an output unit configured to output the aggregate figure drawn by the variable drawing unit, and
    a proofreading unit configured to proofread the form data according to instruction information by a user based on output result of the aggregate figure; and
    the image forming apparatus comprising:
    a data receiving unit configured to receive the form data and variable data designed by the image processing apparatus, and
    an image forming unit that forms an image of the variable data on the form data received by the data receiving unit.

7. The image forming system according to claim 6, wherein
    the variable drawing unit express the aggregate figure as a cloud-like object with shading, no shading, or only maximum contour line.

8. The image forming system according to claim 6, wherein
    the variable drawing unit draws the aggregate figure so that at least a part of each data of the variable data is difficult to be recognized.

9. The image forming system according to claim 6, wherein
    the output unit generates a preview of the entire page including the aggregate figure.

10. The image forming system according claim 6, wherein
    the output unit presents another part of the form data that is affected by output of variable part by using the variable data, by overlapping and outputting an influence example.

11. An image processing method executed by an image processing apparatus for designing variable printing, wherein the image processing apparatus executes the steps of:
    acquiring form data and variable data for variable printing;
    drawing the variable data as an aggregate figure with respect to acquired form data at an area where there is a possibility of drawing influence;
    outputting the aggregate figure that is drawn; and
    proofread the form data based on instruction information by a user based on output result of the aggregate figure.

12. The image processing method according to claim 11, wherein
    expressing the aggregate figure as a cloud-like object with shading, no shading, or only maximum contour line.

13. The image processing method according to claim 11, wherein
    drawing the aggregate figure so that at least a part of each data of the variable data is difficult to be recognized.

14. The image processing method according to claim 11, wherein
    generating a preview of the entire page including the aggregate figure.

15. The image processing method according claim 11, wherein
    presenting another part of the form data that is affected by output of variable part by using the variable data, by overlapping and outputting an influence example.

* * * * *